No. 630,334. Patented Aug. 8, 1899.
W. DODD.
MACHINE FOR MAKING LIGHTNING RODS.
(Application filed Sept. 15, 1898.)
(No Model.) 5 Sheets—Sheet 2.
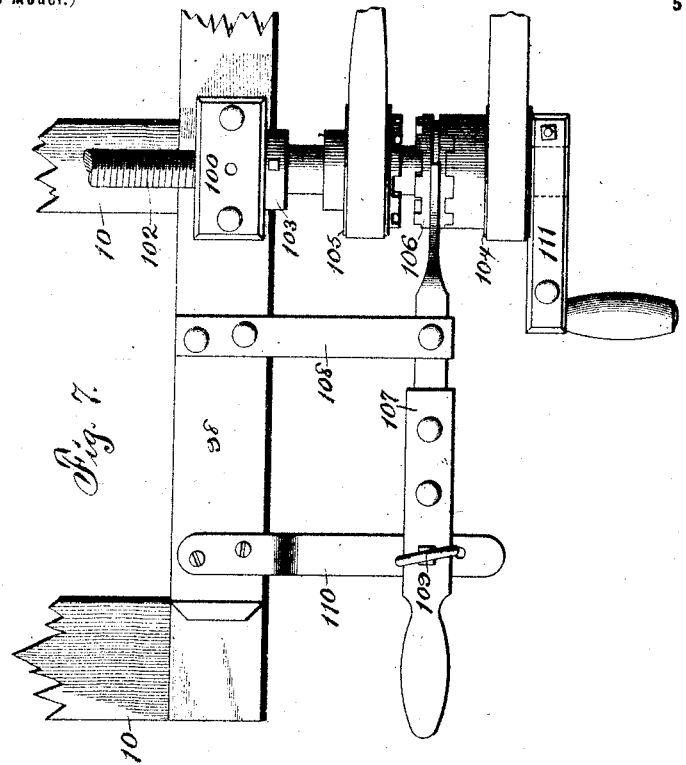
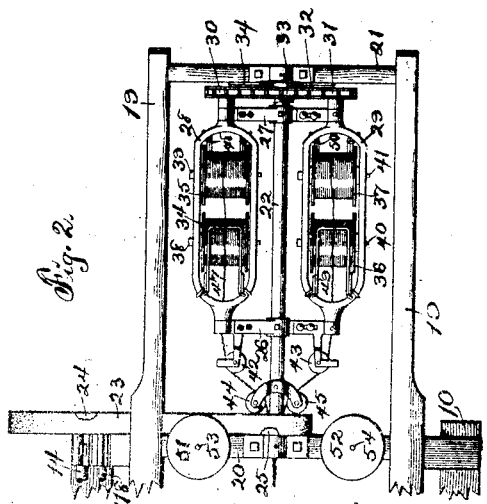
Witnesses: Inventor: West Dodd No. 630,334. Patented Aug. 8, 1899.
W. DODD.
MACHINE FOR MAKING LIGHTNING RODS.
(Application filed Sept. 15, 1898.)
(No Model.) 5 Sheets—Sheet 3.
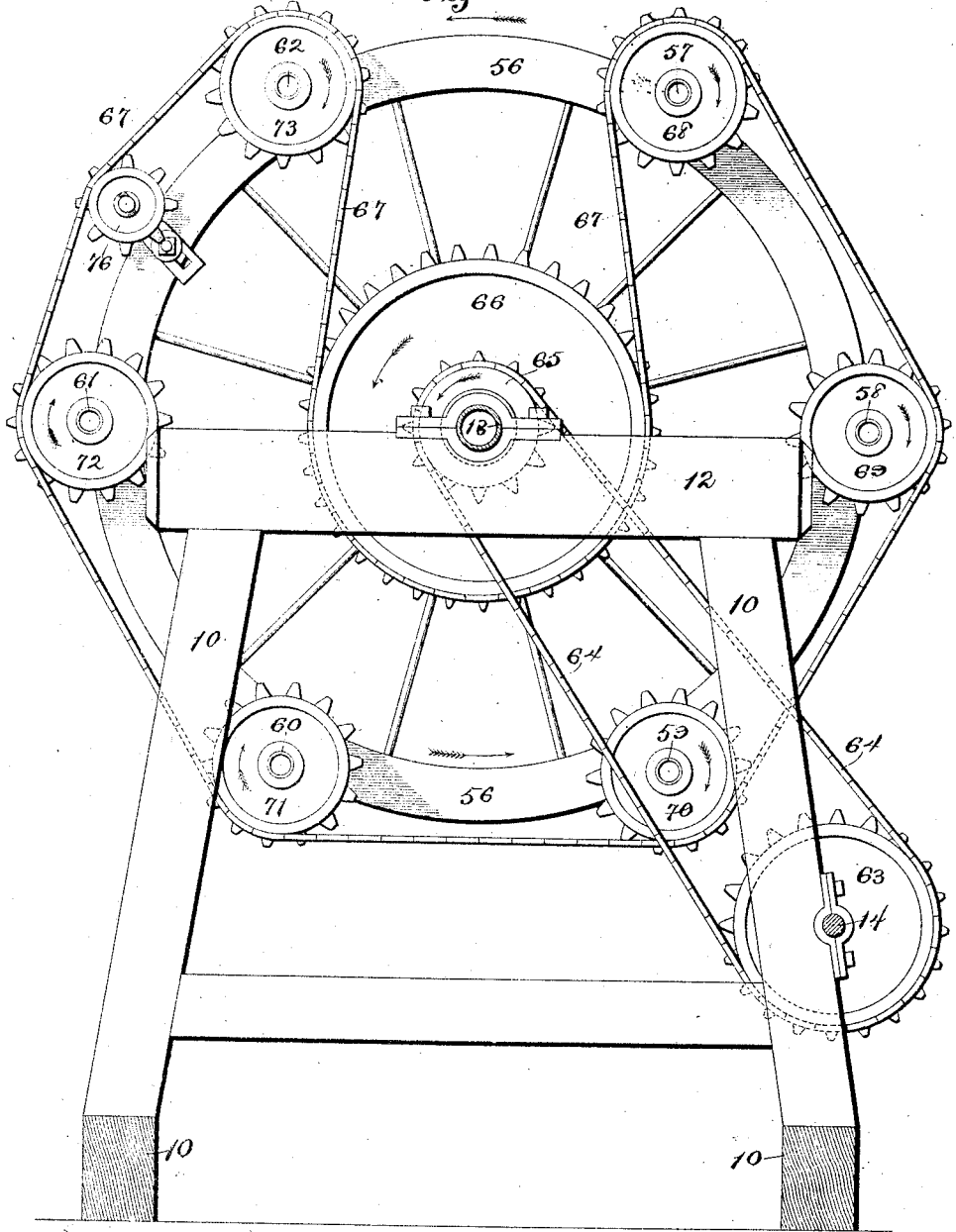
Witnesses: A. D. Struthers, Thomas O. Orwig.
Inventor: West Dodd

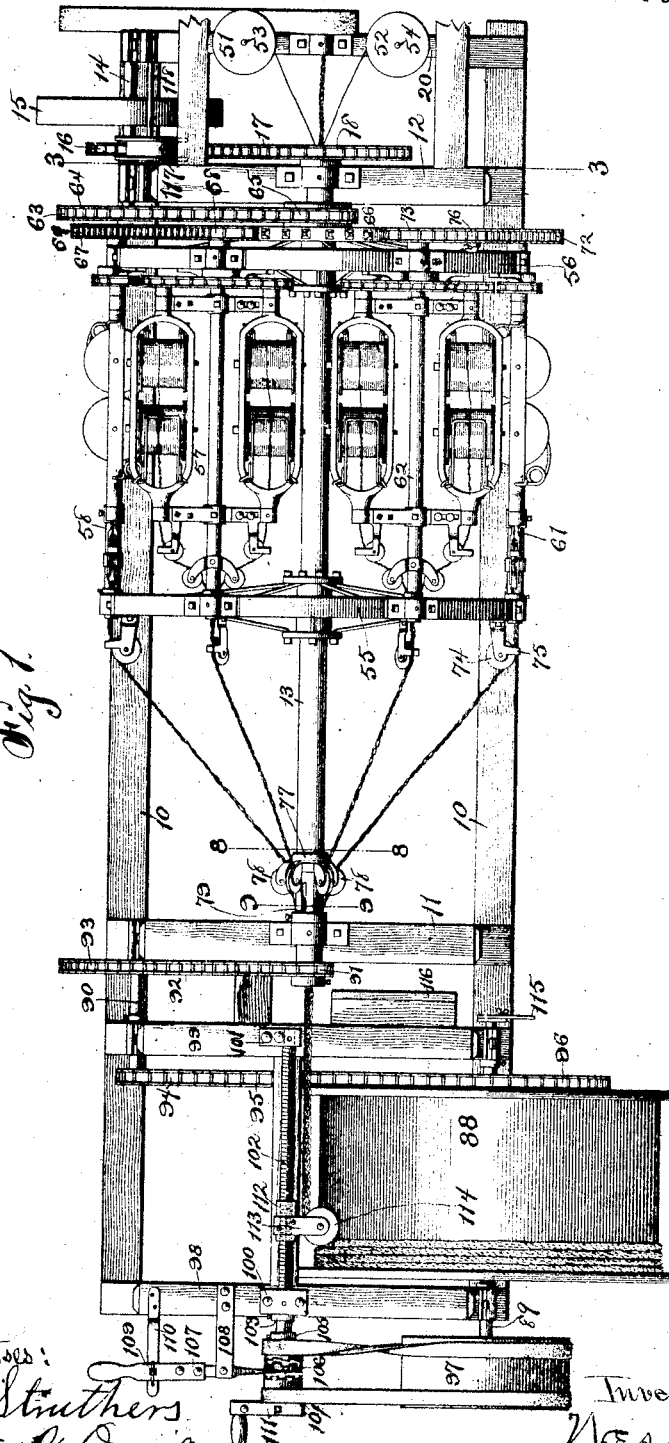

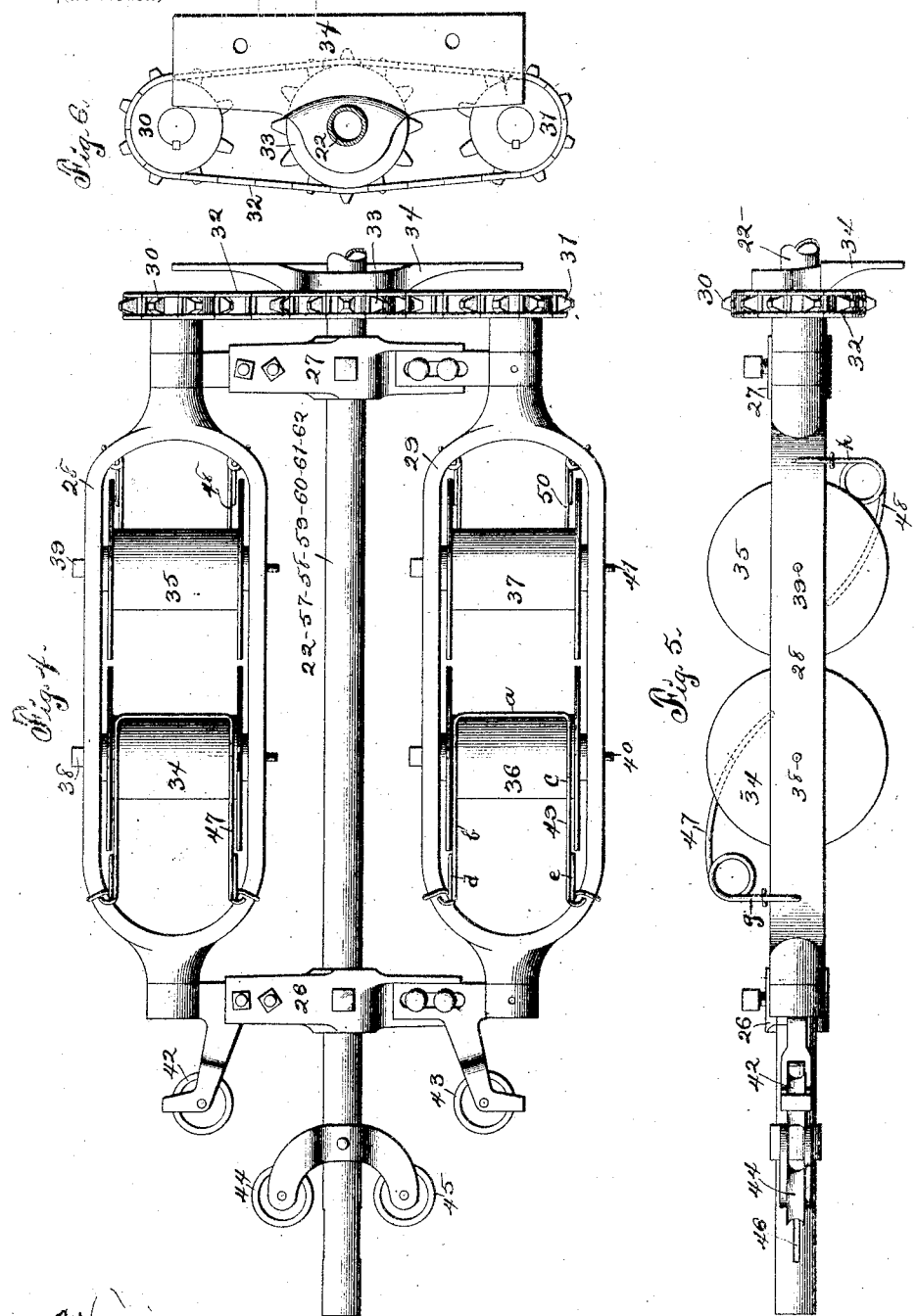

No. 630,334. Patented Aug. 8, 1899.
W. DODD.
MACHINE FOR MAKING LIGHTNING RODS.
(Application filed Sept. 15, 1898.)
(No Model.) 5 Sheets—Sheet 5.
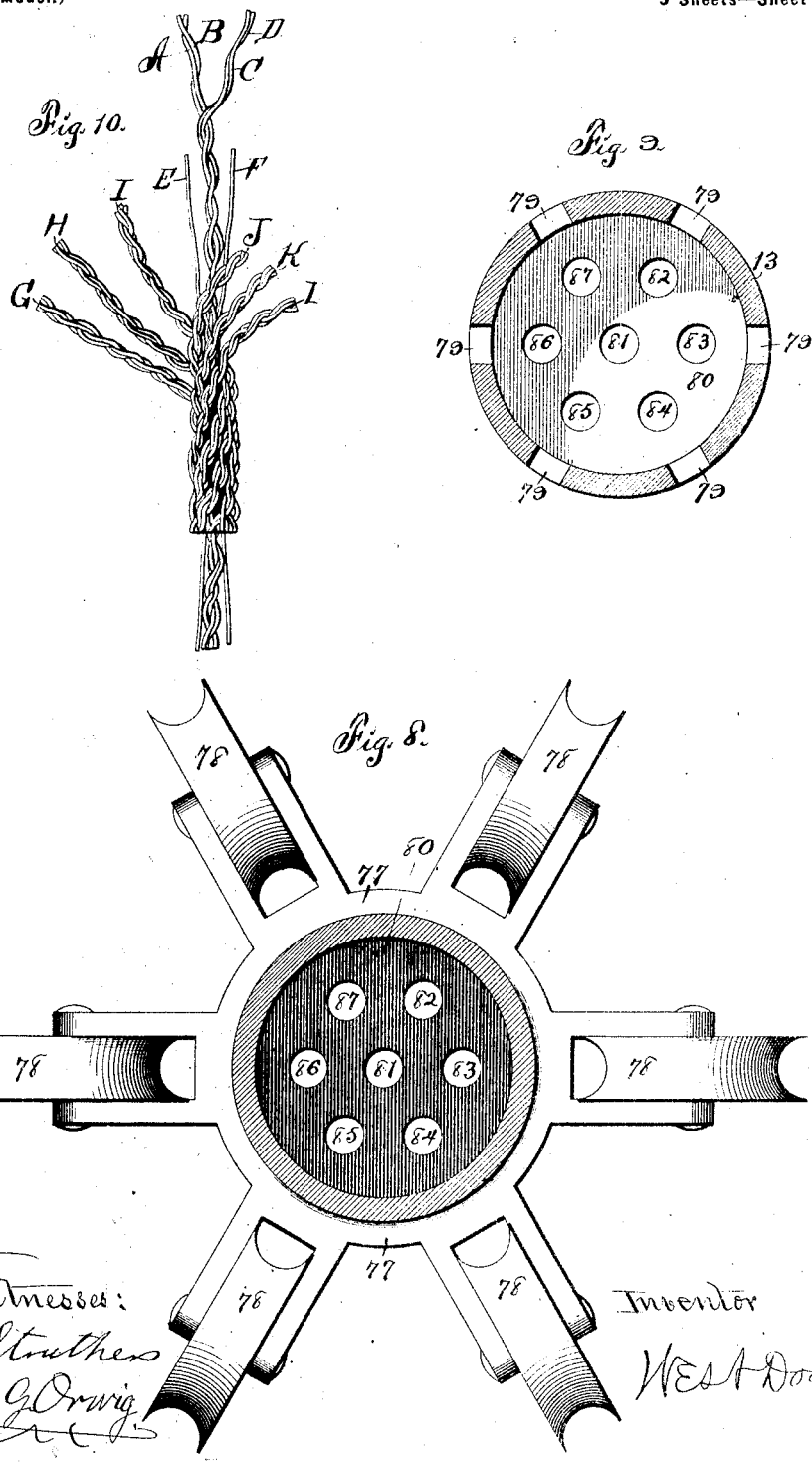

UNITED STATES PATENT OFFICE.

WEST DODD, OF DES MOINES, IOWA.

MACHINE FOR MAKING LIGHTNING-RODS.

SPECIFICATION forming part of Letters Patent No. 630,334, dated August 8, 1899.

Application filed September 15, 1898. Serial No. 691,014. (No model.)

*To all whom it may concern:*

Be it known that I, WEST DODD, a citizen of the United States, residing at Des Moines, in the county of Polk and State of Iowa, have invented a new and useful Machine for Making Lightning-Rods, of which the following is a specification.

My object is to provide a strong, durable, and efficient machine specially adapted for making a flexible lightning-rod of unique construction in which the maximum surface in a given length will be increased for conveying electric currents and a multiplicity of open spaces produced throughout the entire length to produce an enlarged diameter and increased flexibility to facilitate bending and fitting the rod or conductor to and around irregular surfaces.

My invention consists in the construction, arrangement, and combination of elements constituting a machine, as hereinafter set forth, pointed out in my claims, and illustrated by the accompanying drawings.

Referring to the drawings, Figure 1 is a plan of the major portion of the machine, and Fig. 2 is a plan of a minor portion of the machine, Figs. 1 and 2 read together fully illustrating the machine in plan. Fig. 3 is a vertical section of the machine on the indicated line 3 3 of Fig. 1. Fig. 4 is a plan, Fig. 5 a side elevation, and Fig. 6 an end elevation, of one of the twisting devices employed in the machine. Fig. 7 is a detail plan of a portion of the mechanism for governing the reeling of the product of the machine. Fig. 8 is a vertical section in detail on the indicated line 8 8 of Fig 1. Fig. 9 is a detail vertical section on the indicated line 9 9 of Fig. 1. Fig. 10 is an illustration of the product of the machine.

In the construction of the machine as shown the numeral 10 designates a supporting-frame provided with cross-bars 11 12, horizontally positioned thereon. Journal-bearings are mounted rigidly on the central portions of the cross-bars 11 12 in alinement with each other, and a tubular shaft 13 is mounted for rotation in said bearings. A counter-shaft 14 is mounted parallel with the tubular shaft 13 for rotation in bearings fixed to the frame 10, and a drive-pulley 15 is mounted rigidly on the central portion of the counter-shaft and arranged for belting to a prime mover. (Not shown.) A sprocket-wheel 16 is mounted rigidly on the counter-shaft 14 and is connected by a sprocket-chain 17 to a sprocket-wheel 18, rigidly mounted on the initial end of the tubular shaft 13. A frame extension 19 is mounted on and extends outwardly from the initial end of the frame 10 across an end cross-bar 20 of said frame, and a cross-bar 21 is horizontally positioned in the extremity of said extension. Journal-bearings are mounted on the central portions of the cross-bars 20 21 in alinement with the tubular shaft 13, and an auxiliary tubular shaft 22 is mounted for rotation in said bearings. A belt 23 connects a pulley 24 on one end of the counter-shaft 14 with a smaller pulley 25 on the terminal end of the shaft 22. The auxiliary tubular shaft 22 is provided with a pair of cross-heads 26 27, on the extremities of which are adjustably mounted journal-bearings. Spool-yokes 28 29 are mounted for rotation in the bearings on the extremities of the cross-heads 26 27, and the forward end portions of said yokes are tubular. Sprocket-wheels 30 31 are mounted rigidly on the rear ends of the spool-yokes 28 29 and are connected by a sprocket-chain 32, and said chain runs over and under and in engagement with a stationary sprocket 33, fixed to or formed on the bearing 34, supporting the rear end of the tubular shaft 22. Spools 34 35 36 37 are mounted for revolution on pins 38 39 40 41, seated in and transversely of the spool-yokes 28 29, and wires wound upon said spools are extended through the tubular ends of the yokes and through guiding-sheaves 42 43 on the cross-head 26 and guiding-sheaves 44 45 on a cross-head fixed to the terminal end portion of the auxiliary shaft 22 near the pulley 25. The auxiliary shaft 22 is provided with diametrically opposite slots 46 adjacent to the guiding-sheaves 44 45, through which the wires pass from the sheaves into and through the terminal ends of the auxiliary shaft 22. Spring tension devices are provided for each spool, as designated in the drawings by the numerals 47 48 49 50. Each of the tension devices is formed of a single length of wire having a straight central portion a positioned for engagement with and across the coils of the wire on the spool, the curved side portions $b$ and $c$, the coils $d$ and $e$, and the stems $g$ and $h$, the said stems being seated in apertures in the yokes and fixed by wrapping the extremities of the piece of wire forming the device around the stems. Spools 51 52 are mounted for revolution on pins 53 54, seated in vertical positions in the cross-bar 20 on opposite sides of the longitudinal plane of the auxiliary shaft 22, and wires wound on said spools extend on opposite sides of and conjunctively with the cable or strand formed by the wires emanating from the spools 34 35 36 37 into and through the tubular shaft 13 and form the core or center of the lightning-rod or product of the machine.

Circular frames 55 56, comprising hubs and rims connected by spokes, are mounted rigidly and concentrically on the tubular shaft 13, between the cross-bars 11 12, and are spaced apart. Journal-bearings are mounted on the perimeters of the frames 55 56, and auxiliary tubular shafts 57 58 59 60 61 62 are mounted for rotation in said bearings. The auxiliary tubular shafts in the bearings on the frames 55 56 are of the same construction as the auxiliary shaft 22 and carry cross-heads with adjustable bearings on their extremities, spool-yokes in said bearings, spools in the yokes, tension devices on the yokes engaging the coils of wire on the spools, sprocket-chains connecting the spool-yokes in pairs and engaging with stationary sprockets, the guiding-sheaves, and all other elements identical with the construction hereinbefore described in relation to the shaft 22 and devices mounted thereon. (See Figs. 4, 5, and 6.) A sprocket-wheel 63, of larger diameter than the sprocket-wheel 16, is mounted rigidly on the counter-shaft 14 and is connected by a sprocket-chain 64 to a sprocket-wheel 65 of less diameter than the sprocket-wheel 18, loosely mounted on the tubular shaft 13. A sprocket-wheel 66, of greater diameter than the wheel 65, is fixed to said wheel 65 and arranged to revolve on the tubular shaft 13. A sprocket-chain is mounted on the wheel 66 and runs in engagement with and outside of sprocket-wheels 68 69 70 71 72 73, rigidly mounted on the auxiliary shafts 57 58 59 60 61 62.

Guiding-sheaves to the number of six are mounted in brackets 75, fixed to and projecting laterally from the rim of the circular frame 55, adjacent to the terminal ends of the auxiliary shafts 57 58 59 60 61 62 to receive and guide the strands formed by the wires emanating from the spools in the yokes carried by said shafts.

A traveling tightener-wheel 76 is mounted adjustably on and projects radially from the rim of the circular frame 56 to engage and tighten the chain 67.

A collar 77 is mounted rigidly on the tubular shaft 13, near the terminal end of said shaft, and a plurality of guide-sheaves 78, in this instance six in number, are mounted on said collar to receive the strands from the sheaves 74. The tubular shaft 13 is provided with six longitudinal slots 79, adjacent to the sheaves 78, through which slots the strands from said sheaves enter the shaft. A plate 80 is mounted rigidly in the terminal end of the tubular shaft 13 and is provided with a central aperture 81 to permit the passage of the core or center of the cable product. The plate 80 is provided with six apertures 82 83 84 85 86 87, arranged in a row concentric with the aperture 81 to receive the strands from the slots 79 and lay the same in twists upon the core of the cable product.

A reel 88 is mounted rigidly on a counter-shaft 89, mounted for rotation in bearings fixed to the frame 10, the counter-shaft being parallel with the tubular shaft 13. A counter-shaft 90 is mounted for rotation in bearings fixed to the frame 10, parallel with the shaft 13 and on the opposite side of said shaft from the counter-shaft 89. A small sprocket-wheel 91 on the terminal extremity of the tubular shaft 13 is connected by a sprocket-chain 92 with a larger sprocket-wheel 93, rigidly mounted on the counter-shaft 90, and a small sprocket-wheel 94 on said counter-shaft is connected by a sprocket-chain 95 with a larger sprocket-wheel 96 on the counter-shaft 89.

A pulley 97 is mounted rigidly on the counter-shaft 89. Cross-bars 98 99 are horizontally positioned on the frame 10 and spaced apart, and bearings 100 101 are mounted in alinement with each other on the central portions of said cross-bars and laterally removed from the plane of the bore of the shaft 13 opposite to the reel 88. A feeding-shaft 102 is mounted for rotation in the bearings 100 101 and is held against longitudinal movement toward the twisting devices by a collar 103 on the shaft engaging the bearing 100. Pulleys 104 105 are mounted loosely on the feeding-shaft in opposition to the pulley 97 and are of materially less diameter than the said pulley 97. The pulleys 104 105 are spaced apart and their adjacent sides are formed as clutches, and a clutch member 106 is keyed on the shaft between the pulleys and arranged for engagement with one or another of the clutch-faces thereon. A lever 107 is fulcrumed on a bracket 108, laterally projecting from and fixed to the cross-bar 98, and one end of said lever is forked and loosely embraces the clutch member 106. The opposite end of the lever 107 is formed as a handle, and intermediate of the handle and fulcrum is located a pin 109, traversing the lever and seated in one or another of a pair of apertures in a bracket 110, laterally projecting from and fixed to the cross-bar 98, thereby holding the clutch member 106 in engagement with one or another of the pulleys. A winch 111 is mounted on the feeding-shaft 102, whereby said shaft may be manually operated and adjusted. That portion of the feeding-shaft 102 between its journal-bearings is screw-threaded, and a traveling block 112 is interiorly screw-threaded and mounted for travel on said shaft. The traveling block 112 is provided with a laterally-extending bracket 113, carrying a guiding-sheave 114, arranged to receive the cable product of the machine and guide the same upon the reel.

A spider 115 is mounted on the end of the counter-shaft 89 opposite the pulley 97 and engages once in each revolution of said counter-shaft with a registering mechanism (not shown) contained in a box or case 116, mounted on the frame 10. The registering mechanism may be of any suitable construction and is employed to register and account the revolutions of the reel, and thereby facilitate ascertaining the quantity of cable product made by the machine.

Tighteners may be provided for all the chains, as is shown in Fig. 1, where a flanged wheel 117 is mounted on a counter-shaft 118 and peripherally engages the chain 17.

The product of the machine consists of the cable built up as follows: The core is formed of four wires A B and C D, twisted in pairs right-handed and twisted together left-handed and then extended in a straight line, with two wires E F laid parallel with the hawser thus formed and six hawsers G H I J K L laid left-handed upon the core, each of the last-mentioned hawsers comprising two strands twisted left-handed and laid together right-handed.

The manner of forming the several twists will be readily apparent from an inspection of the drawings, with the arrows thereon, in connection with the foregoing description.

I claim as my invention—

1. A machine of the class described, comprising the core-forming mechanism, mechanism for laying straight strands upon the core, the hawser-forming mechanism, the orbital mechanism for laying the hawsers on the core, and the reeling mechanism.

2. The machine of the class described comprising the pair of strand-forming mechanisms combined with the spools to form a core-producing mechanism, mechanism for laying straight strands upon the outside surface of the core along its entire length, the hawser-forming mechanisms, the orbital mechanism for laying the hawsers upon the core, and the reeling mechanism.

3. In a machine for making flexible lightning-rods, the core-forming mechanism, mechanism for laying a plurality of straight wires on the core and parallel with the axis of the core, hawser-forming mechanism composed of a plurality of strand-forming mechanisms, orbital mechanism for laying the hawsers upon the straight wires and the core, all arranged and combined to operate in the manner set forth for the purposes stated.

4. In a machine of the class described, the tubular shaft mounted for rotation, spools mounted on stationary supports at the outer end of said tube for extending strands therefrom through the tube, the circular frames mounted on said shaft, the auxiliary shafts mounted for rotation on said frames and carried in a common orbit thereby, the spool-carrying yokes mounted for rotation on said auxiliary shafts, means for guiding the wires in strands, hawsers and cables, and the reeling mechanism.

5. In a machine for making flexible lightning-rods, a hawser-forming mechanism comprising the shaft, the cross-heads on the shaft, the strand-forming devices on said cross-heads, means for carrying said strand-forming devices around the shaft to produce the core, mechanism for extending straight wires on the core and parallel with the axis of the core and means for guiding the strands, all arranged and combined to operate in the manner set forth for the purposes stated.

6. In a machine for making lightning-rods from a plurality of strands of wire, mechanism for simultaneously twisting four strands to produce a pair of cables, mechanism to twist the pair of cables together to produce a core, mechanism for laying a plurality of straight strands on the core, mechanism for simultaneously twisting together strands in pairs to produce a plurality of cables, mechanism for simultaneously spirally coiling or twisting the plurality of cables on the core and the straight wires laid on and extended with the core, all arranged and combined upon a suitable supporting-frame to operate in the manner set forth for the purposes stated.

7. A machine for making lightning-rods from a plurality of strands of wire, comprising mechanism for simultaneously twisting four strands to produce a pair of cables, mechanism to twist the pair of cables together to produce a core, mechanism for laying a plurality of straight strands on the core, mechanism for simultaneously twisting together strands in pairs to produce a plurality of cables, mechanism for simultaneously spirally coiling or twisting the plurality of cables on the core and the straight wires laid on and extended with the core, spools for all the strands, a prime motor for actuating all the operative mechanisms, and a reel for coiling the finished flexible lightning-rod, all arranged and combined upon a suitable supporting-frame, to operate in the manner set forth for the purposes stated.

WEST DODD.

Witnesses:
ALVIN D. STRUTHERS,
THOMAS G. ORWIG.